United States Patent [19]

Puyear

[11] 3,744,173
[45] July 10, 1973

[54] FISHING ROD FOR CLOSED FACE SPINNING REELS

[76] Inventor: Mark J. Puyear, 46 Cliff St., Battle Creek, Mich. 49017

[22] Filed: June 5, 1972

[21] Appl. No.: 259,931

[52] U.S. Cl. .......................................... 43/23, 43/22
[51] Int. Cl. ...................... A01k 87/00, A01k 87/06
[58] Field of Search ...................... 43/22, 23, 18 R

[56] References Cited
UNITED STATES PATENTS
3,080,673  3/1963  Smith ................................... 43/22
3,426,466  2/1969  Shepherd .............................. 43/22

FOREIGN PATENTS OR APPLICATIONS
66,938   10/1943  Norway ................................ 43/22
376,314   5/1964  Switzerland .......................... 43/22

Primary Examiner—Russell R. Kinsey
Assistant Examiner—Daniel J. Leach
Attorney—Roy A. Plant and Samuel Kurlandsky

[57] ABSTRACT

A fishing rod particularly provided for use with closed face spinning reels comprising a handle, and a body member attached thereto having a forefinger-engaging aperture, and a surface on the body member above the aperture for supporting the thumb. A reel seat is connected to the bottom of the body member and so arranged that the reel seat is below substantially the entire forefinger aperture. A flexible rod is conventionally mounted in a chuck at the other end of the reel seat. The arrangement is such that positive retention of the rod during casting is provided by the forefinger, and additionally the thumb is maintained and supported in an upper position adapted for readily engaging the push button of the spinning reel.

8 Claims, 4 Drawing Figures

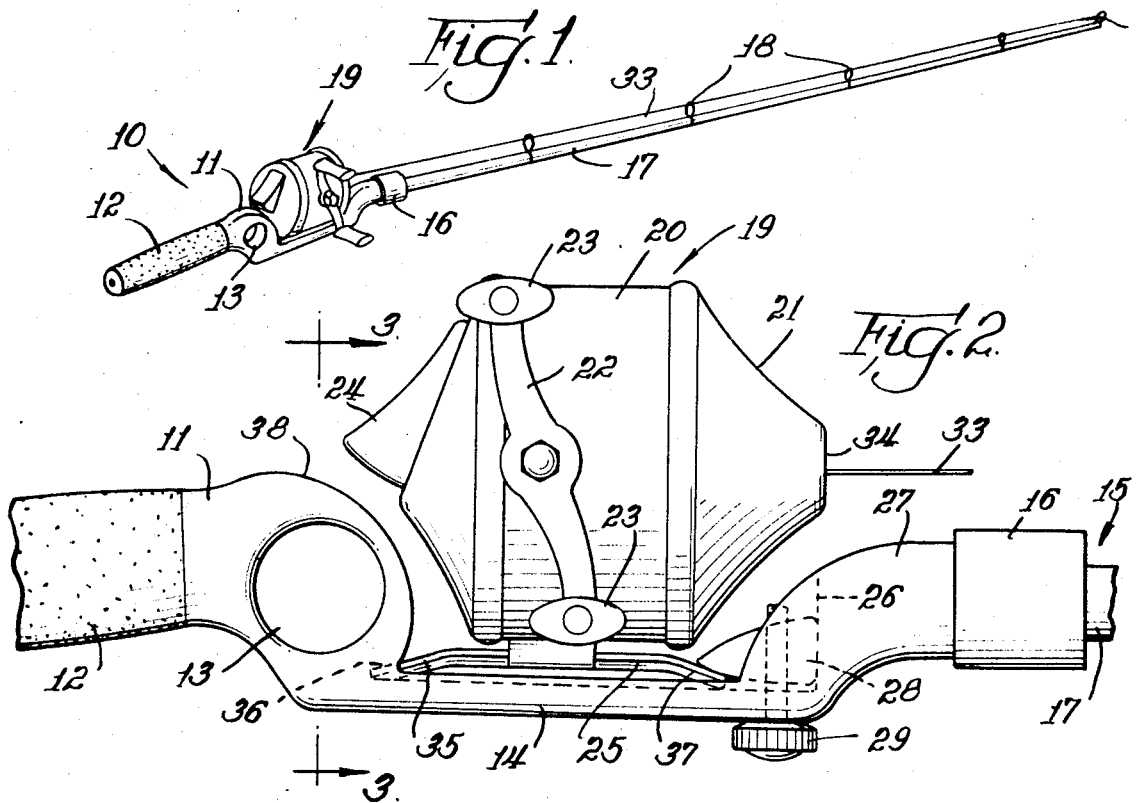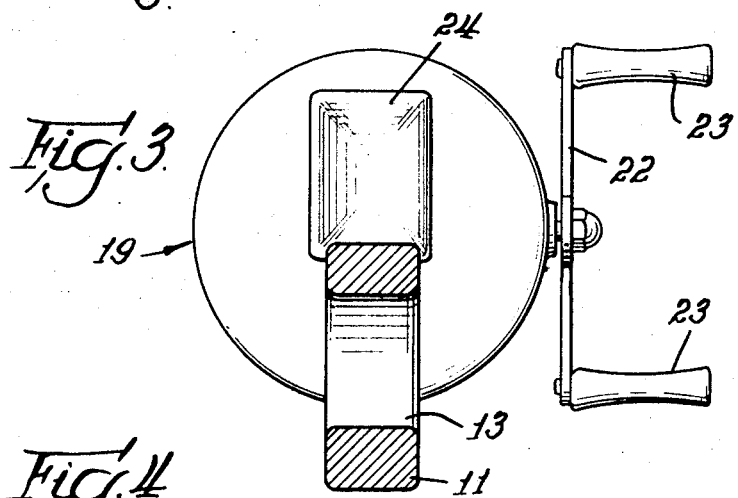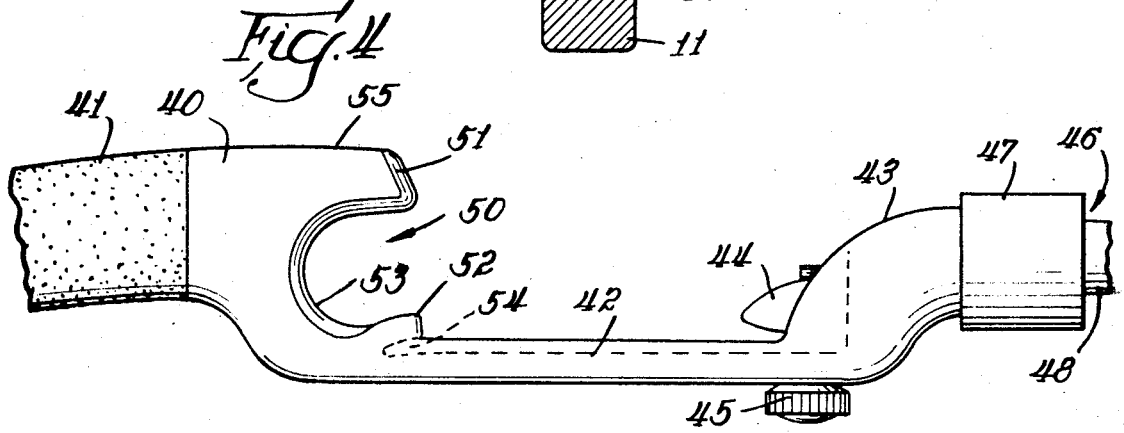

FISHING ROD FOR CLOSED FACE SPINNING REELS

BACKGROUND OF THE INVENTION

The present invention deals with fishing rods, and more particularly refers to fishing rods particularly adapted for use with closed face spinning reels.

Closed face spinning reels have become extremely popular with fishermen, both novice and experienced, in that they offer the advantages of both open face spinning reels and bait-casting reels, without some of their disadvantages. First of all, they provide the advantage of the spinning reel that the spool on which the line is wound is stationary during the cast, thereby avoiding the danger of backlash common with bait-casting reels. Moreover, closed face spinning reels provide this advantage without requiring the fisherman to learn a new technique required for open face spinning reels, since they may be operated similarly to bait-casting reels with which most fishermen are familiar.

Closed face spinning reels have invariably been utilized with conventional rods designed primarily for use with bait-casting reels. Because spinning reels have a different structure and generally have a push button for operating the reel located at an upper portion of the rear of the reel, whereas the bait-casting rod is so designed that the forefinger is positioned below the rod and the thumb is positioned immediately on the rod, the hand is not in a convenient position for operating a spinning reel. First, if the forefinger is merely wrapped around the reel to free the thumb, a positive grasp of the reel is virtually impossible. Moreover, the thumb is not supported in a proper position for operating the push button. If the finger is placed around the normal forefinger grasp of a bait-casting reel, the entire hand is pulled out of position, thereby rendering it extremely inconvenient for operating the push button.

SUMMARY OF THE INVENTION

Accordingly, it is an object of the present invention to provide a fishing rod especially adapted for use with a closed face spinning reel.

It is an additional object to provide a rod of the type described having a convenient means which may be engaged by the forefinger, and whereby the rod may be positively grasped, thereby avoiding the danger that the rod might slip out of the hand of the fisherman during the casting operation.

It is a further object to provide a fishing rod of the type described having a thumb supporting surface for maintaining the thumb in position where it may readily engage the push button of the reel.

It is a further object to provide a rod of the type described which may be economically produced.

Still further objects and advantages of the invention will appear as the description proceeds.

To the accomplishment of the foregoing and related ends, the invention, then, consists of the fishing rod herein fully described and particularly pointed out in the claims, the annexed drawing, and the following description setting forth in detail certain illustrative embodiments of the invention, such disclosed embodiments illustrating, however, but several of the various ways in which the principle of the invention may be used.

BRIEF DESCRIPTION OF THE DRAWING

In the annexed drawing:

FIG. 1 is a perspective view of a fishing rod according to the invention, having a closed face spinning reel mounted thereon.

FIG. 2 is a fragmentary enlarged view showing a portion of the rod having a reel mounted thereon.

FIG. 3 is a cross-sectional view taken at the line 3—3 of FIG. 2; and

FIG. 4 is a fragmentary enlarged side elevational view of a fishing rod representing another embodiment of the invention.

DESCRIPTION OF THE SPECIFIC EMBODIMENTS

Referring to FIG. 1, a fishing rod 10 according to the invention is shown, having a closed face spinning reel 19 mounted thereon. The rod 10 comprises a body member 11, and a handle 12 mounted thereon. A forefinger aperture or slot 13 is provided in the body member 11.

As shown in greater detail in FIGS. 2 and 3, a reel seat 14 is connected to the bottom portion of the body member 11 and is so positioned that it is substantially entirely below the forefinger aperture 13. A forward body member 27 is connected to the reel seat 14 in the form of a curved elbow extending substantially above the reel seat 14. A hold-down clamp 28 engaged by a screw 29 serves to clamp down the base plate 25 of the reel. The forward body member 27 terminates in a chuck 15 having a collar 16 threadedly mounted on the chuck 15 for clamping the end of a flexible rod 17. Guides 18 are mounted on the rod 17, and a line 33 is shown threaded through the guides 18 (FIG. 1).

The spinning reel 19 comprises a cylindrical body portion 20 having a face plate 21 provided with a line aperture 34 through which the line 33 is extended or retracted. A crank 22 having finger grips 23 is provided for rewinding the line 33 on a spool contained within the reel. A push button 24 hinged at its upper end is provided for releasing or engaging the line 33. The reel 19 has a base plate 25 which is affixed to the reel and serves for mounting the reel on the reel seat 14. The heel 35 of the base plate 25 is engaged in a socket 36, and the toe 37 is clamped in place by the hold-down clamp 28 and screw 29.

In gripping the rod shown in FIGS. 1, 2 and 3, the forefinger or index finger is placed in the forefinger aperture 13, the thumb is placed on the thumb supporting surface 38, and the fingers are wound about the handle 12. The presence of the forefinger or index finger in the forefinger aperture 13 provides a very positive gripping means, so that when the cast is made, there is no danger that the handle 12 of the rod will slip out of the fisherman's hand. Moreover, the positioning of the reel seat 14 below the forefinger aperture 13 maintains the reel in a lowered position so that when the thumb is placed on the thumb supporting surface 38, it is adjacent to and in excellent position to engage the push button 24 to release the line or, by complete movement of the button, to grip the line prior to casting.

Referring to FIG. 4, a modified embodiment of the invention is shown comprising a body member 40, a handle 41, a reel seat 42 connected to the lower portion of the body member 40, a forward body member 43 having a reel base plate clamp 44, and tightening screw 45. A chuck 46 having a collar 47 threadedly mounted thereon serves to retain a rod 48. A forefinger aperture 50 is provided in the body member 40. Unlike the forefinger aperture 13 shown in FIG. 2, the aperture 50 is open at the forward portion and is defined by protuberances 51 and 52 of the body member. A separate insert 53 formed of a metal or plastic material may be utilized to define the aperture. The reel seat 42 is positioned below substantially the entire forefinger aperture 50 and cooperates with the protuberance 52 to define a reel base plate heel socket 54. A thumb supporting surface 55 is provided at the upper portion of the protuberance 51.

As can be seen in FIG. 4, since the reel seat 42 is placed below substantially the entire portion of the forefinger aperture, the reel when mounted is positioned in such manner that the thumb supporting surface 55 is adjacent the push button 24 of the reel and can be easily operated from that position. Further, when the hand is placed over the handle 41, the forefinger can be easily inserted in the forefinger aperture 50, and can positively retain the rod during the casting operation.

The fishing rod of the present invention has several advantages over prior art fishing rods. First, the reel seat is placed in a low position so that a closed face spinning reel can be readily mounted thereon. Second, a forefinger aperture is provided in the body member and above the reel seat so that the rod may be conveniently grasped and positively retained during the casting operation. If desired, a separate ring insert of any material such as aluminum or brass may be mounted in the forefinger aperture of either embodiment. Third, the body portion of the reel has a thumb supporting surface at its upper portion permitting the thumb to rest thereon in a position immediately adjacent the push button, so that the push button can be conveniently operated by the thumb as it rests on the supporting surface.

While only several forms of the invention have been shown and described, other forms within the spirit and scope of the invention will now be apparent to those skilled in the art. Therefore, the embodiments shown in the drawing are to be considered as merely setting forth the invention for illustrative purposes, and are not intended to limit the scope of the invention herein described, shown and claimed.

The embodiments of the invention in which an exclusive property or privilege is claimed are defined as follows:

1. A fishing rod particularly adapted for use with a closed face spinning reel adapted to be mounted thereon having mounting means and a thumb-operated push button at the rear portion of said reel, said fishing rod comprising:
   a. a body member having a thumb-supporting surface at the upper portion thereof,
   b. a handle mounted at the rear of said body member,
   c. a forefinger-engageable aperture provided transversely in said body member,
   d. a reel seat connected to a lower portion of said body member and having means for engaging the mounting means of said reel,
   e. means for mounting a rod, and
   f. a flexible rod supported by said mounting means (e) and having line guides thereon; said reel seat being positioned below substantially the entire portion of said forefinger-engageable aperture, thereby enabling said thumb and said forefinger to be so positioned that said push button may be readily operated by said thumb and said rod readily gripped by the forefinger of the operator during a casting operation.

2. A fishing rod according to claim 1, wherein said forefinger-engageable aperture is completely closed.

3. A fishing rod according to claim 1, wherein said reel seat is provided with a heel socket at one end and a screw clamp at the other for retaining the mounting means of a reel.

4. A fishing rod according to claim 1, wherein said forefinger-engageable aperture is open at a forward edge and defined by protuberances provided on said body member.

5. In combination:
   I. a fishing rod, and
   II. a closed face spinning reel mounted thereon, said reel (II) comprising:
      a. mounting means,
      b. a thumb-operated push button at the rear portion thereof, and
      c. a hand-operated crank for operating said reel, said fishing rod (I) comprising:
      a. a body member having a thumb-supporting surface at the upper portion thereof,
      b. a handle mounted at the rear of said body member,
      c. a forefinger engageable aperture provided transversely in said body member,
      d. a reel seat connected to a lower portion of said body member and having means engaging the mounting means of said reel,
      e. means for mounting a rod, and
      f. a flexible rod supported by said mounting means (e) and having line guides thereon; said reel seat being positioned below substantially the entire portion of said forefinger-engageable aperture, whereby when said thumb is placed on the thumb-supporting surface of said body member it is immediately adjacent to said push button and said push button may be operated without removing said thumb, and whereby said rod may be readily gripped by the forefinger of the operator during a casting operation.

6. A fishing rod and a closed face spinning reel mounted thereon, according to claim 5, wherein said forefinger-engageable aperture is completely closed.

7. A fishing rod and a closed face spinning reel mounted thereon, according to claim 5, wherein said reel seat is provided with a heel socket at one end and a screw clamp at the other for retaining the mounting means of a reel.

8. A fishing rod and a closed face spinning reel mounted thereon, according to claim 5, wherein said forefinger-engageable aperture is open at a forward edge and defined by protuberances provided on said body member.

* * * * *